March 3, 1959  F. E. WEATHERSBY  2,875,546
PURSE BOATS WITH IMPROVED SEINE HANDLING
MEANS AND METHOD OF USING THE SAME
Filed July 26, 1956  3 Sheets-Sheet 1

Fred E. Weathersby
INVENTOR.

BY *Clarence A. O'Brien*
*and Harvey B. Jacobson*
Attorneys

March 3, 1959
F. E. WEATHERSBY
2,875,546
PURSE BOATS WITH IMPROVED SEINE HANDLING
MEANS AND METHOD OF USING THE SAME
Filed July 26, 1956
3 Sheets-Sheet 2
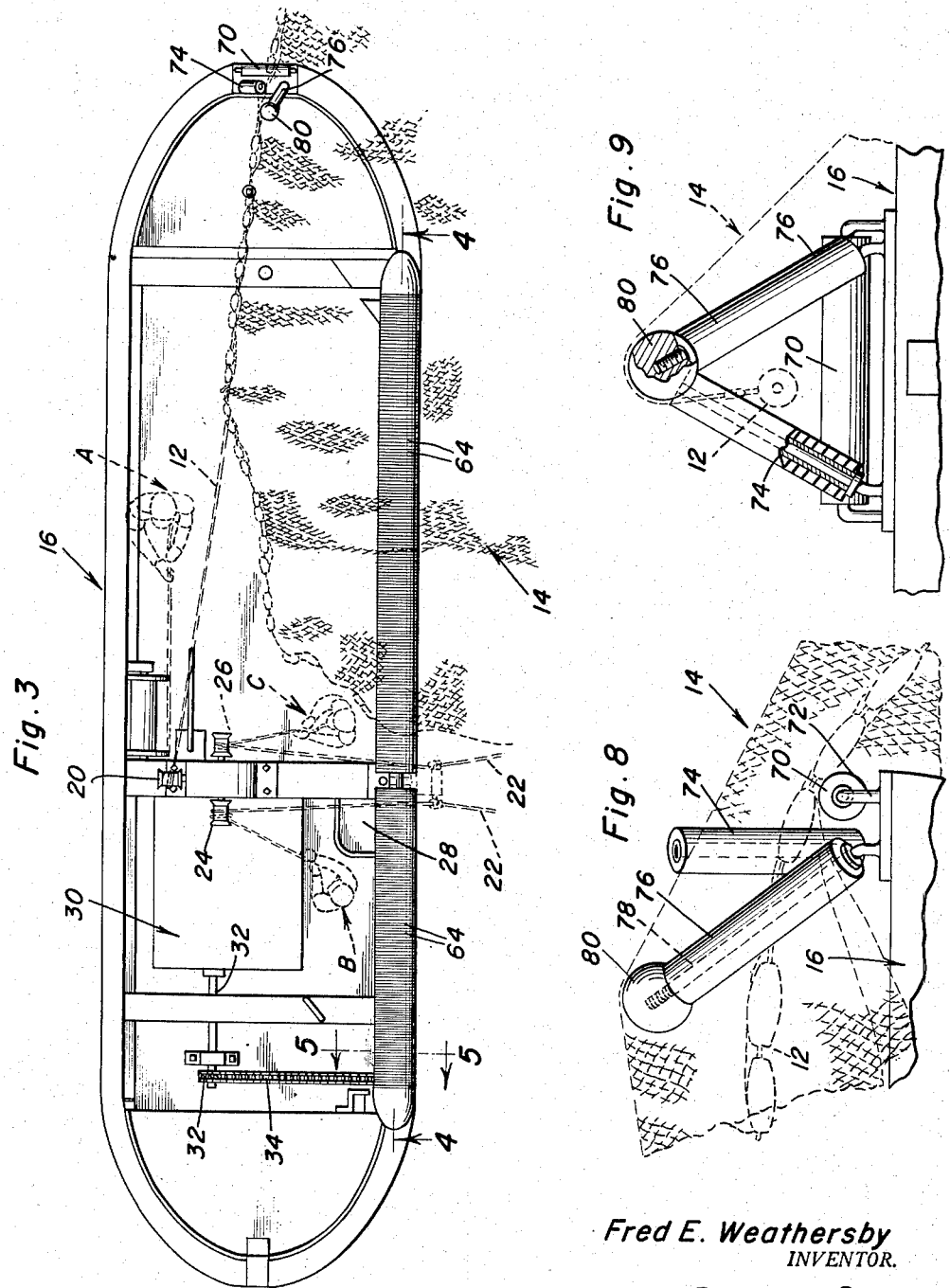
Fred E. Weathersby
INVENTOR.
BY *Clarence A. O'Brien*
*and Harvey B. Jackson*
Attorneys March 3, 1959
F. E. WEATHERSBY
2,875,546
PURSE BOATS WITH IMPROVED SEINE HANDLING
MEANS AND METHOD OF USING THE SAME
Filed July 26, 1956
3 Sheets-Sheet 3
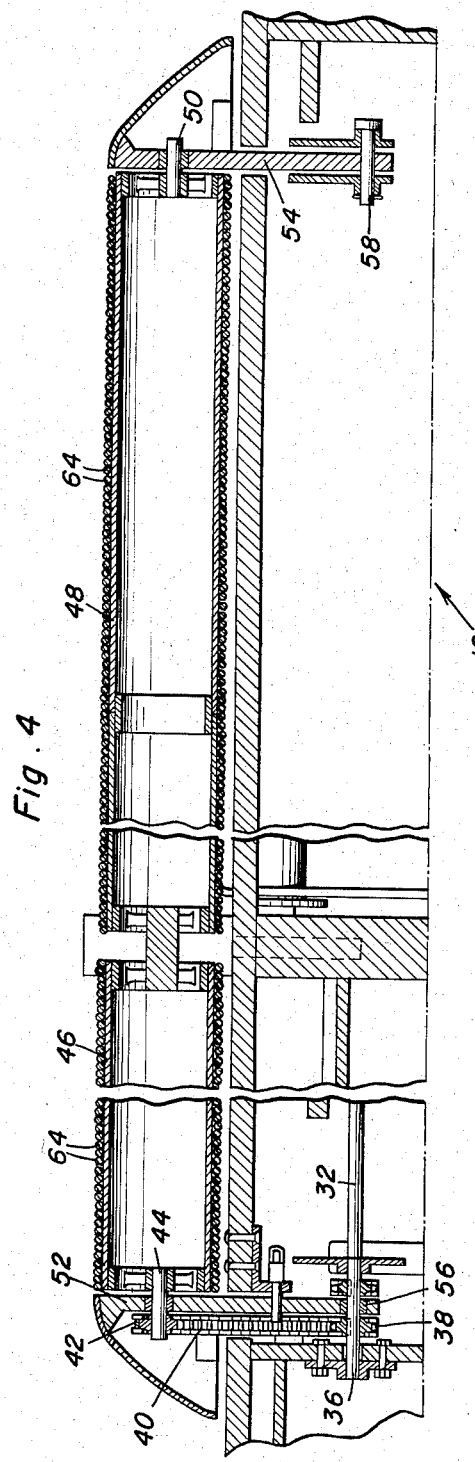
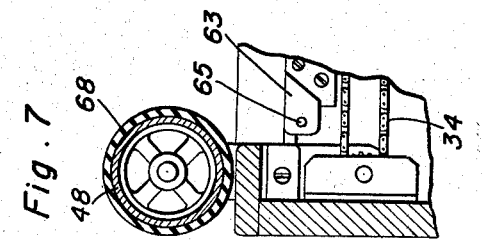
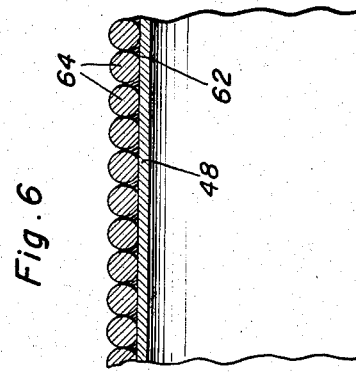
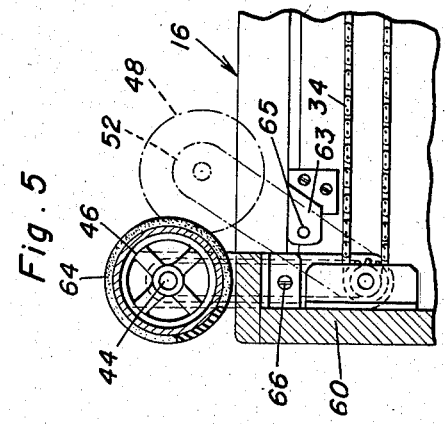
Fred E. Weathersby
INVENTOR.
BY
*Clarence A. O'Brien*
*and Harvey B. Jacobson*
Attorneys though in this instance the invention involving the so-called purse boats and improved seine handling means is shown;

United States Patent Office
2,875,546
Patented Mar. 3, 1959

2,875,546

PURSE BOATS WITH IMPROVED SEINE HANDLING MEANS AND METHOD OF USING THE SAME

Fred E. Weathersby, New Orleans, La., assignor of one-tenth to H. H. Hill, Port Arthur, Tex.

Application July 26, 1956, Serial No. 600,227

4 Claims. (Cl. 43—8)

The present invention relates to improved method steps involved in the procedure of fishing for menhaden fish and pertains, more particularly, to improved purse boats and the means with which they are rigged to expedite carrying out the method under advisement.

In order to properly understand and comprehend the significance of the contribution to the art which is herein under advisement, it is important that one should first understand the present method of handing a purse seine when making a set on a school of menhaden. For example, when a lookout in the crow's-nest sights a school of menhaden the seine-setter uses a striker boat to follow the fish, indicate their position, and finally, to support the corkline after the net is set. The purse boats and crews head for the front of the school, separate and quickly release the seine, encircle the school, bring the ends of net together, heave the conventional weight media overboard which is ordinarily used for closing the bottom, and guiding purseline as it is hauled in to purse the net. The crews haul in the ends and bottom of net, concentrate the fish in the pouch portion of seine, which is placed against the side of menhaden steamer, and the catch is brailed or otherwise loaded into the hold of the steamer.

The purse boats (usually two) are small open-type boats from which the seine is handled during the fishing operation. The boat with double headed winch is usually referred to as the "captain's" boat, and the other as the "mate's" boat. These boats are approximately 33 feet in length and approximately 8 feet in width, and are usually constructed of steel. The net is carried in the large open space in the after part of each boat. Half of the net is stored on each boat. When not actually fishing, the boats are carried upon or towed behind the larger vessel or menhaden steamer which carries the fish caught by the purse boats, and which also provides living quarters and other necessary accommodations for the crew.

The purse seine or net is usually 1200 to 1500 feet in length, and approximately 75 to 125 feet in depth. All purse seines are effectively long straight sections of net webbing which, when placed in the water, extend from the surface, downward. The net is suspended in the water by means of a series of floats attached to a line at the top of the net. This line is referred to as a "cork line." At the bottom of the net, spaced at intervals, are large rings, usually made of metal, through which is passed one continuous length of line. This line is called a "purse" line.

In pursuing the usual steps in menhaden fishing methods now invoked, the purse line is, of course, handled by mechanical power means including a double headed winch and, so far as is known, this is the only mechanical aid or equipment abroad which appropriates the necessary energy to purse the net or seine. Also, as is known, it is necessary for a crew to manually pull aboard approximately 1200 feet of cork line and approximately 90,000 square feet of net webbing. To say the least this is an extremely laborious task which is multipled many times when a considerable number of fish are trapped within the pursed portion of the net or seine. As a matter of fact there are often as many as 200,000 more or less fish in a good catch. The fact that hauling the complemental net portions into the purse boats involves brute strength of the fisherman has for sometime posed a problem. It follows that one objective in the instant presentation is to make it possible to reduce the number of men required to perform the fishing operation and, in addition, the concept has to do with enabling a smaller number of men to handle the net, to do this more rapidly and with less physical effort, thereby enabling the fishermen to set the net many more times than otherwise possible per day and thus increasing the number of fish likely to be caught.

The method and means herein disclosed is novel in that it provides the long sought after method of replacing human labor with mechanical force, yet does not exert brute force on the net itself. This is important because when a large school of fish is within the net and the net is being drawn aboard the purse boats, the fish often strike the net with great force and if the net is being pulled at that time, it will usually break and the fish will be lost. Expensive repair to the net will be necessary. Briefly, an aspect of the method phase of the concept has to do with handling and hauling in a seine after a catch of menhaden has been completed and the usual pair of abutting purse boats have been obliquely angled with their respective sterns physically abutting the cooperating side of the usual crew accommodating menhaden steamer or vessel, which consists in providing power driven net suspending hauling-in means atop the port gunwale of one purse boat and providing corresponding means likewise atop the starboard gunwale of the other purse boat, whereby the fish laden pursed or pouch portion of the seine is capable of being lifted more readily and rapidly and the portions of the seine assigned respectively to the net storing spaces of said boats are capable of being pulled aboard by said means and the men on board with a minimum of physical effort involved in so doing.

More specifically and from a structural point of view, the invention pertains to rigging or equipping each purse boat at its stern with an arrangement of members providing novel guide means for hauling the cork line aboard for storage preparatory to putting out for the next maneuver. Novelty is also predicated, more importantly, on providing means either at the top of or near the top of the gunwale with a roller or an equivalent device which is power driven and aids in dragging and pulling the heavily loaded net aboard.

Novelty is also predicated on providing the surface of the hauling-in roller or means with windings of cords providing the desired and seemingly necessary traction surface which does what is desired and which also allows relative slippage between the seine and said surface to minimize bursting the net under adverse conditions.

Other objectives and aspects of the concept will become more readily apparent from the following specification and the accompanying sheets of drawings.

In the drawings:

Fig. 3 is a plan view of one of the purse boats hereinafter identified as the "captain's" boat and equipped with the improved seine hauling means;

Fig. 4 is an enlarged lengthwise section on the line 4—4 of Fig. 3 with portions broken away;

Fig. 5 is a section on an enlarged scale on the line 5—5 of Fig. 3;

Fig. 6 is an exaggerated fragmentary section through a portion of the traction surface of the roller;

Fig. 7 is a view similar to Fig. 5 and showing a modified rubber covered roller;

Fig. 8 is a side elevation, fragmentary in nature, observing the stern of the "captain's" boat seen in Fig. 3 and detailing the special means provided to assist the men aboard in hauling in the cork line; and Fig. 9 is a view at right angles to the showing seen in Fig. 8 and with portions broken away and appearing in section.

Figure 1:
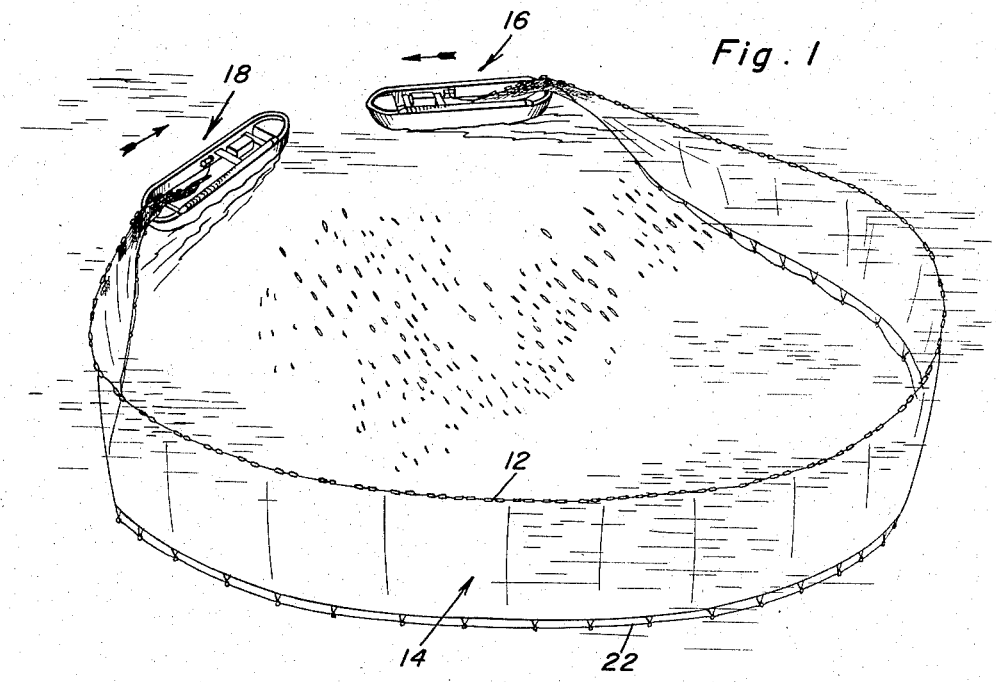
Fig. 1 is a perspective view showing a pair of purse boats after they have encircled the school of fish and moving to bring the ends of the net together, the net being hung or suspended in the water with the fish fenced in thereby.
Figure 2:
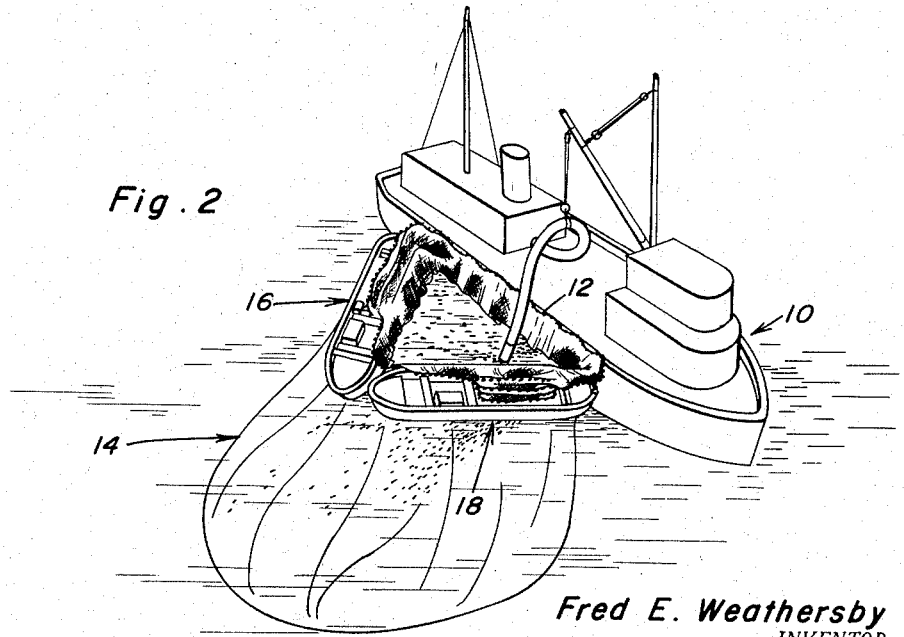
Fig. 2 is a perspective view showing the so-called menhaden steamer with a pair of divergent purse boats alongside same with the bow ends together and the stern ends abutting the steamer and the net pursed so that the catch may be brailed into the steamer's hold.

Referring now to the drawings and first to Fig. 2 the aforementioned vessel which will be conveniently referred to here as the crew accommodating or menhaden steamer is denoted by the numeral 10 and is of customary type. A portion of the cork line 12 is shown fastened along the deck of one side of the steamer, this being the customary portion of the purse seine or net 14. The purse boat to the left is denoted by the numeral 16 and the companion boat to the right is denoted at 18. For purposes of this disclosure no description of the steamer 10 is thought to be necessary. Also and since both purse boats are basically the same in construction only one has been detailed and this is shown in Fig. 3 and may be conveniently denoted by the aforementioned numeral 16. These purse boats have already been described in the preliminary portion of the description.

For convenience it is here mentioned that when approaching a school of fish, the purse boats run parallel to and touching each other, with their bows and sterns tied together. Upon reaching the fish the bow and stern lines are dropped and the purse boats separate. When the boats separate, the net is allowed to pass over the stern and into the water. Each boat will then run through approximately a half circle so that they will meet again when the entire net is in the water. Each boat has now gone half way around the fish. As the boats meet again, the net is hanging in the water in a manner similar to a circular curtain. Both ends of the purse line are now brought into the captain's boat and are hauled aboard by means of the double headed winch in the captain's boat. This action closes the bottom of the net in a manner similar to closing a drawstring-type purse; hence, the name "purse seine."

With reference to Fig. 3 the purse line 12 is wound on the winch or reel 20 and is handled and guided by one of the men or fishermen aboard as at A. The purse lines 22 in Fig. 3 are handled by the men B and C with the aid of the winches 24 and 26. It is to be mentioned in connection with the above that the present method of fishing menhaden does not, of course, include a means of pulling the cork line in with power. The receptacle or holder 28 which is used to accommodate the said conventional weight media is well known. The cork line is guided aboard by man A with the aid of a fairlead or rope 12 resorting to and using the available power of winch 20. More particularly, the fairlead 12 is connected to the cork line by a suitable clamp (not detailed). As the cork line is hauled aboard it is laid in the net space and folded in such a manner that it is readied for the next setting of the net. Power to drive the roller 64 to winch 20 may be provided by any suitable means. For purposes of the present disclosure the power plant of the purse boat is used to power the roller 64 and also the winch 20. Broadly, the prime mover or power plant is here denoted by the numeral 30 and this serves to operate a drive shaft 32 preferably driving a sprocket wheel 32 and a complemental sprocket chain 34. Motion is thus imparted to a driven shaft 36, sprocket wheel 38, sprocket chain 40 and complemental sprocket wheel 42 on a stub power applying shaft 44 on one end of the roller means. The roller means may be said to be made up of a pair of axially aligned rollers or complemental roller portions 46 and 48.

The journal of shaft 44 and the complemental journal 50 at the right hand end in Fig. 4 are journaled in bearing means provided therefor in the respective arms 52 and 54 hingedly mounted at 56 and 58 respectively so the roller assembly and arms may be swung from the full line position seen in Fig. 5 to the phantom line position shown in the same figure. The idea here is to be able to bring the roller means into play above the plane of the upper edge of the gunwale 60 of the boat or to swing the roller means inboard into an out-of-the-way position. Since the purse boats are used in pairs and since they approach each other during the course of operation it is necessary to swing the respective rollers thereon out of the way when conditions require it.

In practice the surface of the rollers is provided with a plastic or mastic coating or equivalent media 62 as shown in Fig. 6 and then the coated surface is wrapped with rope. The rope windings are denoted at 64 and the material 62 is preferably sticky tar.

Any suitable stop brackets may be provided as at 63 in Fig. 5 and the bracket may have a keeper hole 65 to accommodate an insertible and removable pin 66. This same pin is used to fasten the roller means either in an erect usable position as shown at the left in full lines or when the roller means is in the released or out of the way position.

As already pointed out the only difference between the construction seen in Fig. 7 is that instead of using rope means 64 to provide the traction surface said surface may be acquired by a rubber or equivalent covering or sleeve as at 68.

As before mentioned the power driven rollers are along the gunwales of the purse boats, that is on the port gunwale of the captain's boat and on the starboard gunwale of the mate's boat. Under present day conditions the net is hung from and dragged across the upper edge of the gunwale by hand. In the instant situation the portions of the net will be passed over the respective rollers and the men will at the same time yank down on the net and this will provide the necessary traction and will pull the net over the roller means and drop it into the net storage space of the purse boats. Mechanical means is also provided for assisting in hauling in the cork line. This means is at the stern of the boat and comprises a horizontal freely rotatable primary roller 70 bracketed in place as at 72, an inclined freely idling companion inboard roller 74 and an opposed inclined and obliquely angled freely rotatable guide roller 76. The latter is removably mounted on an obliquely angled shaft 78 having a spherical head or knob 80 on the upper end thereof which assists in dragging the net into the boat and onto the adjacent end portion of the main gunwale roller means without tearing or destroying the net.

It will be evident that the subject matter of the invention has to do with the problem of bringing the net back aboard the boats after it has been set and makes it possible to perform the time and energy saving method steps apparent from the procedure depicted in Fig. 2 of the drawings. With this invention it is no longer necessary to appropriate and rely upon brute force of the seine handling fisherman. Keeping in mind the fact that the net is difficult to handle under ordinary circumstances after it has been pursed and when it contains tons of fish, it is also to be also kept in mind that the fish are alive and that they put their full strength against the net in an attempt to escape. When a large school of fish is within the net and the net is being drawn aboard the purse boat the fish strike the net with such force that the net being pulled at the same time will more likely than not break. By using this development the roller will be allowed to exert only a limited force on the net. This force will be a function of the downward pressure exerted upon the net by the crew as the net passes over the roller. If a sudden movement of the fish should stop the net momentarily the roller will slip and the net will not start coming aboard until the fish release their collective pull. In this respect the roller means provides a friction drag compensating device. It makes possible the step of dragging or hauling in the net step-by-step not impeded by friction, as is ordinarily the case. Attrition and chafing of the net is reduced to a minimum. The burdensome effort of the men aboard is eased and the roller devices on both gunwale and stern portions not only function as anti-friction means but they increase the mechanical advantage and minimize the manual force otherwise required. With this invention it is no longer necessary to tug with strenuous dragging force on the net as it is hauled aboard. It will be evident, therefore, that this invention and the method which it makes possible is calculated to solve the problems of all hands concerned.

What is claimed as new is as follows:

1. A purse boat having friction-drag diminishing means on the upper portion of at least one gunwale, said means serving to assist the fishermen who are aboard said purse boat in hauling a purse seine, loaded or not, aboard for storage, a source of power aboard said boat and an operating connection between the prime mover and said friction-drag diminishing means, said means embodying a substantially horizontal roller, arms pivotally mounted inboard said boat and adapted to swing inwardly over underlying portions of the boat to assume out-of-the-way positions, that is, positions which so locate the arms so that they are not likely to come into damaging contact with a cooperating roller on a companion purse boat, especially when the boats are close together and alongside each other during a particular seine setting maneuver, said roller being mounted for rotation between outer end portions of said arms.

2. In combination, a purse boat, arms hingedly mounted interiorly of the upper portion of at least one gunwale of said boat, said arms being adapted to swing inwardly to out-of-the-way positions and upper portions of the arms being adapted to be disposed above the upper edge of said gunwale when the arms are in use, the upper portions of said arms being provided with bearings, a horizontally disposed elongated roller having journals mounted for rotation in their respective bearings, said roller serving to permit portions of a seine to be suspended therefrom and dragged inwardly over the roller into a seine storage space of the boat, a prime mover mounted in said boat, and an operating connection between the prime mover and roller whereby the roller may be turned.

3. The structure defined in claim 2 and in combination, means covering the surface of said hauling-in roller, said means embodying cords wound tightly around the surface and transforming the surface into that which is possessed of prerequisite traction properties while at the same time allowing intended relative slippage between the seine and said surface thus to minimize the likelihood of bursting the net under adverse conditions.

4. In combination, a purse boat, arms hingedly mounted interiorly of the upper portion of at least one gunwale of said boat, said arms being adapted to swing inwardly to out-of-the way positions and upper portions of the arms being adapted to be disposed above the upper edge of said gunwale when the arms are in use, the upper portions of said arms being provided with bearings, a horizontally disposed elongated roller having journals mounted for rotation in their respective bearings, said roller serving to permit portions of a seine to be suspended therefrom and dragged inwardly over the roller into a seine storage space of the boat, a prime mover mounted in said boat, an operating connection between the prime mover and roller whereby the roller may be turned, and antifriction means adapted to be mounted on the upper portion of the stern of said boat and cooperating with said roller and characterized by a horizontally disposed freely rotatable primary roller which is adapted to be bracketed in place at the stern of the boat, an inclined freely idling companion inboard roller, and an oblique angled freely rotatable guide roller, said several rollers being cooperable as a group to facilitate handling not only the corkline but progressively and simultaneously complemental or adjacent body portions of the seine proper.

References Cited in the file of this patent
UNITED STATES PATENTS

| | | |
|---|---|---|
| 712,370 | Gaffney | Oct. 28, 1902 |
| 1,863,989 | Liisantti | June 21, 1932 |
| 2,342,773 | Wellman | Feb. 29, 1944 |